Nov. 14, 1944.　　　C. J. LUNDBORG　　　2,362,652
ELECTRIC CONTROL
Filed Jan. 21, 1942　　　2 Sheets-Sheet 1
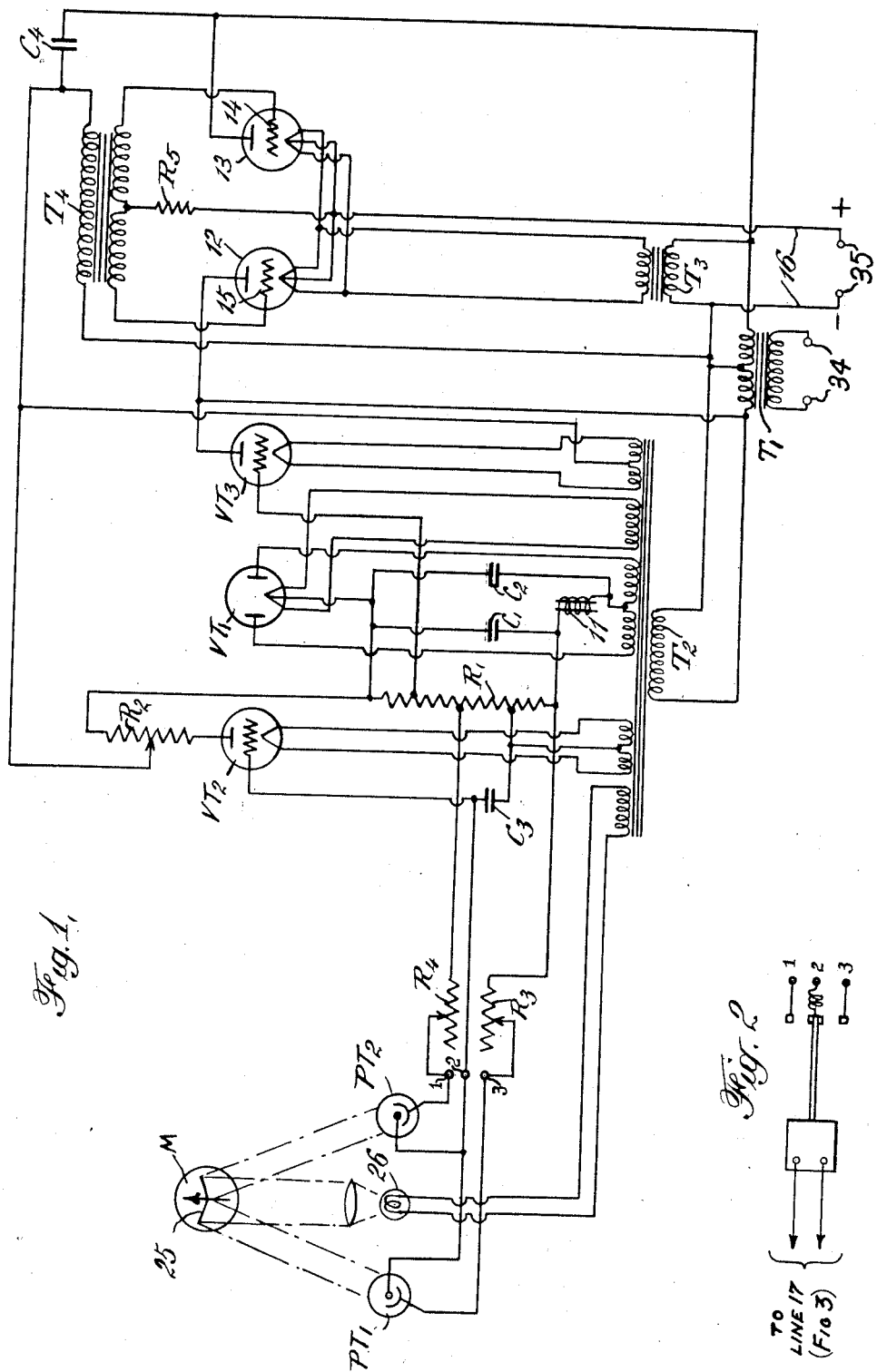
INVENTOR
Carl J. Lundborg
BY
Pennie, Davis, Marvin and Edmonds
ATTORNEYS

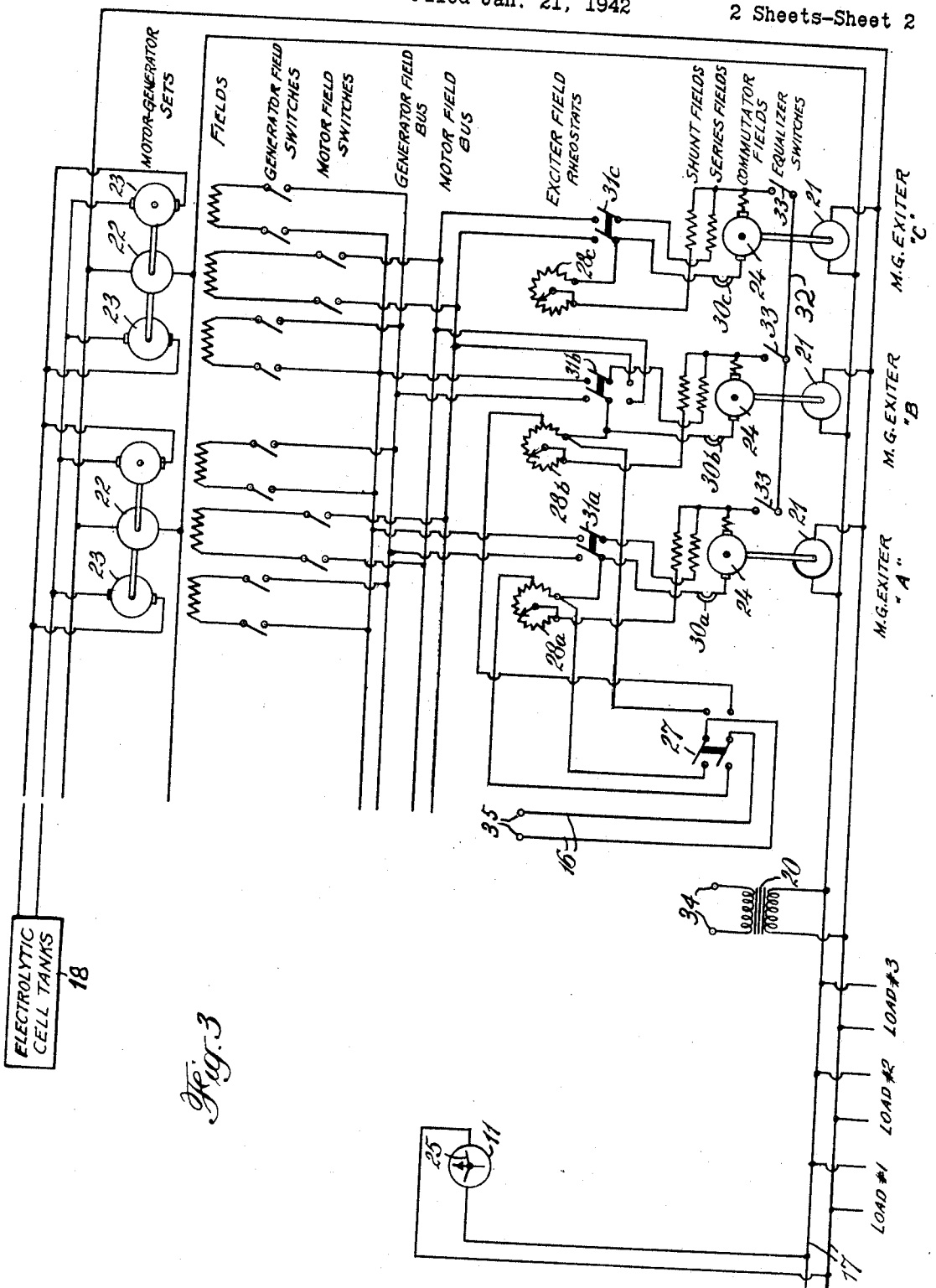

Patented Nov. 14, 1944

2,362,652

UNITED STATES PATENT OFFICE 2,362,652

ELECTRIC CONTROL

Carl J. Lundborg, Great Falls, Mont.

Application January 21, 1942, Serial No. 427,567

4 Claims. (Cl. 171—123)

This invention relates to electric control circuits, and, more particularly, to electric control circuits involving control of the output grid control rectifiers. The invention is particularly applicable to control of the total load imposed by a plurality of independent loads upon a common source of electric power.

Numerous operations involving the use of electric apparatus call for a control device which will effect a desired variation in the operation of the electric apparatus. For exmple, in the operation of a plant using electric power for various purposes such as for electrolytic cells, a rolling mill, tram system, etc., it is frequently desirable to maintain the total power used in the plant at a substantially constant value. This may be accomplished if means are provided for controlling the power absorbed by one of the loads so as to maintain the total power consumed at a predetermined desired value or rate, particularly when the power is paid for on the basis of a peak load rate. In a plant such as that referred to above wherein the power absorbed by such units as the rolling mill, tram system, etc., is a variable yet cannot be controlled at will because of the demanding nature of these loads, the electrolytic cells represent a load which may be economically varied substantially at will and in such manner that the total amount of power consumed by all loads in the plant remains substantially constant at the peak load value, or at any other desired value. The present invention provides a control circuit capable of thus maintaining a substantially constant power consumption in such a plant, particularly by control of the power absorbed by the electrolytic cells, although the invention is applicable to many other operations in which control of the combined output of a plurality of grid control rectifiers may be utilized for control of electric apparatus.

The control circuit of my invention for regulating the combined output of a plurality of grid control rectifiers comprises a plurality of grid control rectifiers interconnected to combine the output of the individual rectifiers, means for providing the grids of the rectifiers with a potential having a predetermined phase relationship with the potential of the plates of the rectifiers, and means including relay means for controlling or regulating the phase relationship between the grid and plate potentials of at least one of the rectifiers in such manner as to control the combined output of the interconnected rectifiers. The phase relationship between the grid and plate potentials of the rectifiers is advantageously such as to obtain a substantially intermediate output from each of the rectifiers, and the phase relationship between the grid and plate potentials of at least one of the rectifiers is regulated by a variable superposed potential responsive to the variation is an electric apparatus which it is desired to control.

These and other features of the invention will be more fully understood by reference to the accompanying drawings, in which—

Fig. 1 is a circuit diagram of an apparatus embodying the invention;

Fig. 2 shows one form of contact assembly that may be used in the circuit illustrated in Fig. 1; and Fig. 3 is a circuit diagram showing one application of the control circuit of my invention to control of the power absorption in an illustrative plant arrangement, this figure being drawn as a continuation of Fig. 1.

Referring to Fig. 1 of the drawings, $T_1$ represents a transformer for supplying power for the control circuit. A second transformer $T_2$ is connected across the center tap and one end of the secondary of transformer $T_1$ and supplies power for the operation of the three thermionic tubes $VT_1$, $VT_2$ and $VT_3$ and the circuits appurtenant thereto. The tube $VT_1$ comprises a full wave rectifying tube connected across a secondary of the transformer $T_2$. The direct potential output of the tube $VT_1$, which is filtered through the circuit including the choke coil $11$ and the condensers $C_1$ and $C_2$, is connected across the resistance $R_1$ which serves as a voltage divider. The positive side of the voltage divider $R_1$ is connected through the resistor of potentiometer $R_2$ to the plate of the vacuum tube $VT_2$. The negative side of the voltage divider $R_1$ is connected through the variable resistance $R_3$ and the photoelectric cell $PT_1$ to the grid of the tube $VT_2$. The cathode of tube $VT_2$ is connected to the voltage divider $R_1$ at a point positive with respect to the negative side of the voltage divider, and the cathode and grid of the tube $VT_2$ are interconnected through a condenser $C_3$. The grid of the tube $VT_2$ is also connected through the photoelectric tube $PT_2$ and the variable resistance $R_4$ to a point on the voltage divider $R_1$ which is positive with respect to the point on $R_1$ to which the cathode of the tube $VT_2$ is connected. Thus, the photoelectric cell $PT_1$ is in a circuit which connects the grid of the tube $VT_2$ to a source of negative potential and the photoelectric cell $PT_2$ is in a circuit which connects the grid of the tube $VT_2$ to a source of positive potential.

In the operation of this portion of the control circuit, light falling with equal distribution from a source hereinafter described, upon the photoelectric cells $PT_1$ and $PT_2$ permits current to flow in the two circuits including the photoelectric cell $PT_1$ and the resistance $R_3$ and including the photoelectric cell $PT_2$ and the resistance $R_4$, respectively, thus tending to balance the negative and positive potentials imposed on the grid of the tube $VT_2$ controlled by these two circuits. Under these conditions current will flow through the tube $VT_2$. When, however, the distribution of light intensity on the two photoelectric cells is such that more light falls upon $PT_2$ than on $PT_1$, the conductivity of the photoelectric cell $PT_2$ is greater than that of the cell $PT_1$ and consequently a less negative potential is imposed on the grid of the tube $VT_2$. The speed with which this change in light distribution between the two photoelectric cells is reflected by the change in grid potential in the tube $VT_2$ is controlled, with any given capacity for the condenser $C_3$, by the values of the variable resistances $R_3$ and $R_4$. By the proper selection of the values of the resistances $R_3$ and $R_4$, any rapid oscillation or fluctuation in the light distribution between the two photoelectric cells is substantially completely damped and does not result in a corresponding oscillation of the grid potential of the tube $VT_2$. This is true of both types of relay means here disclosed, viz., the photoelectric cell type of Fig. 1, and the mechanical type of Fig. 2, later to be described. As the potential of the grid of the tube $VT_2$ becomes more positive the current flowing through this tube increases. An increase in the negative bias of the grid of the tube $VT_2$, resulting from more light falling on the photoelectric cell $PT_1$ than on the cell $PT_2$, decreases the tube current flowing through the tube $VT_2$.

The vacuum tube $VT_3$ acts as an electronic valve. The grid of the tube $VT_3$ is connected to the voltage divider $R_1$ at a point negative with respect to the positive end of the voltage divider. The center tap of the cathode of the tube $VT_3$ is connected to the sliding contact of the potentiometer $R_2$. Accordingly, the bias voltage on the grid of tube $VT_3$ is the difference between the voltage drop on the voltage divider $R_1$ from its positive end to the point at which the grid of $VT_3$ is connected and the voltage drop in the potentiometer $R_2$ between the positive end of voltage divider $R_1$ and the sliding contact of the potentiometer. By adjusting the position of the sliding contact on the potentiometer to give a negative bias to the grid of $VT_3$ when the tube current of $VT_2$ is normal, an increase in the tube current of $VT_2$ will produce a greater voltage drop in the potentiometer $R_2$, thus decreasing the negative grid bias in the tube $VT_3$. With a decrease in the negative bias on the grid of the tube $VT_3$, the tube current flowing through the tube $VT_3$ increases. Thus, with more light falling on the photoelectric cell $PT_2$ than on the cell $PT_1$, the tube current through $VT_2$ increases and the tube current through $VT_3$ also increases, whereas a reversal of this light distribution causes a decrease in the tube currents of both $VT_2$ and $VT_3$.

The grid control rectifier circuit providing the controlled power output for the desired regulation of an electric apparatus includes two gas-filled grid control rectifiers, or "Thyratrons," 12 and 13. The filaments of the rectifiers are supplied from a filament transformer $T_3$ connected across one-half of the secondary of the transformer $T_1$. The plates of the rectifiers 12 and 13 are connected across the ends of the transformer $T_1$ secondary. An auxiliary circuit comprising the condenser $C_4$ and the primary of the transformer $T_4$ is connected between the plate of the rectifier 13 and the center tap of the transformer $T_1$ secondary. The grid 14 of the rectifier 13 and the grid 15 of the rectifier 12 are connected across the ends of the secondary winding of the transformer $T_4$. The auxiliary circuit causes a potential to be impressed on the grids 14 and 15 having a definite phase relationship with the plate potentials of the rectifiers 13 and 12, respectively. The magnitude of the grid current of the rectifiers is limited by the resistance $R_5$ connected between the center tap of the transformer $T_4$ secondary and the cathodes of both rectifiers. The plate of the vacuum tube $VT_3$ is connected to the same end of the transformer $T_1$ secondary as is the plate of the rectifier 12, and the cathode of the tube $VT_3$ is connected to the auxiliary circuit at a point common to the condenser $C_4$ and the end of the primary of transformer $T_4$ remote from the end connected to the center tap on transformer $T_1$, completing the plate circuit of tube $VT_3$. Thus, the variable plate current flowing through the vacuum tube $VT_3$ and entering the auxiliary circuit between the condenser $C_4$ and the primary of the transformer $T_4$, acting as a variable superposed potential substantially out of phase with the grid potentials of the rectifiers 12 and 13, alters the phase relationship between the grid and plate potentials of the rectifiers 12 and 13 (and also modifies the effective amplitudes of the grid potentials). These changes in phase relationship effect corresponding changes in unidirectional output current from rectifiers 12 and 13. The output current from the interconnected rectifiers 12 and 13 is obtained through line 16 comprising connections to the center tap of the transformer $T_1$ secondary and to the center taps of the interconnected cathodes of these rectifiers.

This embodiment of the invention may be applied, as shown in Fig. 3, to the maintenance of the power consumption of a plant including an electrolytic cell tank room, Fig. 3 being drawn as a continuation of Fig. 1, terminals 34 and 35, respectively, of both figures being identical. The various independent power consuming loads may comprise rolling mills, smelters, tram systems, compressors, and the like, and are represented in Fig. 3 by loads #1, #2 and #3 connected across the power line 17. To simplify the diagram this power line is shown as comprising but two wires, but a multi-phase line is usually employed in such plants. Variations in the power absorbed by these loads are automatically compensated by control, in accordance with the present invention, of the power consumed by the electrolytic cell tanks 18. The power transformer 20 is connected to the power line 17 and through terminals 34 to the primary of transformer T, of Fig. 1, and supplies to the primary of the transformer $T_1$ power necessary for the operation of the control circuit shown in Fig. 1. Also connected to the power line 17 are the motors 21 of the motor-generator exciters A, B and C and the motors 22 of the plurality of motor-generator sets which supply direct current power to the electrolytic cell tanks 18. The field excitation for the motors 22 and generators 23 of these motor-generator sets is provided by the generators 24 of the motor-generator exciters A, B and C.

The power meter M (shown generally) is connected in known manner to the power line 17 in order to indicate the total power consumed by the entire plant. The meter M, which is provided with a divided mirror 25, is connected to the power line in such manner that a drop in the plant power consumption below the desired rate of power consumption causes the light from a suitable light source 26 to be reflected from the mirror 25 with greater intensity on the photoelectric cell PT2 than on the cell PT1 of the control circuit illustrated in Fig. 1. This causes an increase in tube current through the vacuum tube VT2, and a corresponding increase in the output of the interconnected rectifiers 12 and 13 through lines 16. The output of the interconnected rectifiers 12 and 13 through terminals 35 in lines 16, as shown in Figs. 1 and 3, is connected to the double throw switch 27. By means of the switch 27 the output of the interconnected rectifiers 12 and 13 may be connected across a portion of either of the field rheostats 28a and 28b which are connected in series with the shunt fields of the generators 24 of the motor-generator exciters A and B, respectively. The current output of the interconnected rectifiers 12 and 13 is supplied to field rheostat 28a or 28b in such manner that an increase in output current increases the total current flowing through the shunt field of either of the generators 24 of exciters A and B, thus tending to increase the output of these exciters, which in turn increases the output of generators 23, thus increasing the load on motors 22 and therefore on power line 17.

It will be noted that the output of the interconnected rectifiers through lines 16 is connected into the shunt field circuit of the motor-generator exciter A or B by taps onto the field rheostat 28a or 28b so that the current output through lines 16 flows through a portion of either rheostat acting as a fixed resistance in the shunt field circuit of each exciter. However, this is primarily a connection in the interest of convenience and accordingly the lines 16 may instead be connected across a separate fixed resistance in the shunt field circuit of either exciter A or B. The control circuit supplying the current output through the lines 16 is advantageously operated in such manner that under normal conditions (i. e. when an equal light distribution falls on the photoelectric cells PT1 and PT2) the current output from the interconnected rectifiers of the control circuit provides at least a substantial portion of the current flowing through the shunt field of the generator 24.

The output from the generator 24 of the motor-generator exciter A is connected through its series field, the circuit breaker 30a and the switch 31a to the bus supplying excitation to the fields of the generators 23. The output from the generator 24 of the motor-generator exciter B is connected through its series field and the circuit breaker 30b to a double-throw switch 31b which is adapted to supply the output of exciter B either to the bus for the fields of the generators 23 or to the bus for the fields of the motors 22. The output from the generator 24 of exciter C is connected through the circuit breaker 30c and the switch 31c to the bus for the fields of the motors 22. Thus, complete flexibility is afforded for utilizing the controlled current output from the control circuit in varying the power output from the generators 23 to the electrolytic cell tanks 18 by means of variations in the field excitation of either the generators or motors of the motor-generator sets. Uniformity in operation and output of the exciters A, B and C is enhanced by the equalizing connection between each of the exciter generators 24 comprising the line 32 and the equalizer switches 33. Inasmuch as the power output of the generators 23 to the electrolytic cell tanks 18 represents converted power obtained from the power line 17, variations in the power supplied to the electrolytic cell tanks represent variations in the power consumed by this load on the power line.

The control circuit of my invention has many advantages over control circuits proposed or used heretofore. When the variable resistances R3 and R4 are adjusted to give the proper time constants to the circuit including the condenser C3, there is substantially no hunting and the operation of the control circuit is smooth and uniform. The design of the control circuit is also such that once it is calibrated and adjusted to give the desired control output this calibration is not disturbed by subsequent changes in the operating constants of the tubes. The accuracy and sensitivity of the control circuit are to some extent dependent upon the relay system used to translate to the rest of the control circuit the electrical variation to be controlled. Where photoelectric cells are used as such a relay, as shown in the specific embodiment of the invention illustrated in Fig. 1, no moving contacts are involved and the output of the control circuit is directly responsive to the distribution of light intensity on the two photoelectric cells, thus giving a proportional step control. The photoelectric cells PT1 and PT2 may be so illuminated that only one or the other of these cells is illuminated when the meter reading is either above or below its normal position. Where a contact relay such as that shown in Fig. 2 is used in place of the photoelectric cells (the connections to the control circuit represented by the numerals 1, 2 and 3 being the same as in Fig. 1), the contact relay may be of a very delicate design because the currents passing between the contacts, being substantially only the grid current in the tube VT2, are of the order of microamperes. The range of the control circuit (regardless of the type of relay used) is readily adjusted to meet any conditions by regulation of the potentiometer R2 which determines the magnitude of the grid bias of the tube VT3.

The control circuit of the invention may be used in any electric system wherein control of the system may be effected by a variable direct current comprising the output of the interconnected rectifiers. For example, the control circuit may be used to effect voltage regulation of an A. C. or D. C. generator, or for supplying part or all of the field excitation of a D. C. motor, or for supplying all or part of both field and armature current of a D. C. motor as a means of speed and torque control of the motor. The control circuit may also be used to regulate current in an A. C. circuit by supplying the direct current output of the control circuit to a D. C. winding of a saturable core reactor in the A. C. circuit. Thus, the control circuit may be used with advantage in any service wherein a variable but controlled direct current, within the current capacity of the rectifier tubes, may be utilized.

I claim:

1. A plant adapted to consume electric power at a substantially constant rate comprising a plurality of independent variable loads connected to a source of electric power, a plurality of electrolytic cells, a motor-generator set having the motor connected to said power source and the generator connected to the electrolytic cells, a motor-generator exciter having the motor connected to said power source and the generator connected to the motor-generator set in such manner as to influence the output of the motor-generator set to the electrolytic cells, a control element adapted to respond to a variation in the total power absorbed by said independent loads, the motor-generator set and the motor-generator exciter, and a control circuit comprising a plurality of gas-filled grid control rectifiers interconnected to combine the outputs of the individual rectifiers, the combined output of said rectifiers being connected to the motor-generator exciter in such manner as to influence the output of the exciter, means for providing the grids of the rectifiers with a potential having a predetermined phase relationship with the potential of the plates of the rectifiers, and means responsive to said control element for controlling the phase relationship between the grid and plate potentials of at least one of the rectifiers in such manner as to control the combined output of the interconnected rectifiers and hence the output of the motor-generator set to the electrolytic cells so as to maintain the power absorbed by all of the loads at a substantially constant value.

2. A plant adapted to consume electric power at a substantially constant rate, comprising, a source of alternating electric power, an independent load subject to wide variation in power consumption connectible to said source, a dependent load of a type capable of absorbing power economically over a wide range of rates and including at least one electrolytic cell, a motor-generator set of which the motor is connected to said source and the output of the generator is connected to supply said dependent load, said motor-generator set including a field winding, a control element connected to respond to variations in the total power consumed by said plant, a control circuit including a plurality of gas-filled rectifiers having control-grid and plate electrodes, said plate electrodes being interconnected to combine the outputs of the individual rectifiers, means responsive to the combined output of said rectifiers to control the current in said field winding, means impressing on the grids and plates of said rectifiers alternating potentials having a predetermined phase relation, and means responsive to said control element for varying the phase relation of the grid and plate potentials of said rectifiers in accordance with said variations in power consumed by said independent load and in such manner that the rate of power consumption by said plant remains substantially constant.

3. A plant adapted to consume electric power at a substantially constant rate, comprising, a source of alternating electric power, and independent load subject to variation in power consumption connectible to said source, a dependent load of a type capable of absorbing electric power economically over a range of rates, a motor-generator set of which the motor is connected to said source and the electric output of the generator is connected to supply said dependent load, regulating means associated with said motor-generator set for controlling the output of said generator, a control element connected to respond to variations in the total power consumed by said plant, a control circuit including at least one gas-filled rectifier tube having control-grid and plate electrodes, means responsive to the output of said rectifier to control said regulating means, means impressing on the grid and plate electrodes of said rectifier tube alternating potentials having a predetermined phase relation, and means responsive to said control element for varying the phase relation of said grid and plate potentials in accordance with said variation in power consumed by said independent load and in such manner that the rate of power consumption by said plant remains substantially constant.

4. In a power control system, an alternating-current power source, a load, a rectifier coupled to said source and having an output circuit, a first resistor connected in said output circuit so that output current from said rectifier flows therethrough, a first vacuum tube having a cathode, a grid, a plate and a plate circuit between said cathode and plate, said plate circuit including a portion of said resistor and a second resistor connected in series, two photoelectric cells each having two electrodes, a connection from said cathode to a point on said first resistor, a common connection from one electrode of each of said photoelectric cells to the grid of said vacuum tube, and connections from each of the other electrodes of said photoelectric cells to different points on said first resistor which are negative and positive, respectively, with respect to the point of connection of the cathode of said vacuum tube on said first resistor, whereby actuation of said photoelectric cells tend to impress on said grid a resultant control potential in accordance with the relative actuation of said photoelectric cells, means including adjustable means connected to said vacuum tube for determining the response of said vacuum tube to the actuation of said photoelectric cells, a second vacuum tube having a cathode, a grid, and a plate, a connection from the grid of said second vacuum tube to a point on said first resistor and a connection from the cathode thereof to a point on said second resistor, a first transformer having a secondary provided with an intermediate tap, two gas-filled grid control rectifiers having their plates connected across said secondary, said secondary being coupled to said power source, load control means responsive to changes in output current from said rectifiers for modifying the power consumption on said source, the cathodes of said rectifiers being connected through said load control means to said intermediate tap, an auxiliary circuit including a condenser and the primary of a second transformer connected between the plate of one of said rectifiers and said tap, the plate of the other of said rectifiers being connected to the plate of said second vacuum tube, a connection from the cathode of said second vacuum tube to said auxiliary circuit at a point common to said condenser and one end of the primary of said second transformer, the grids of said two rectifiers being connected across the secondary of said second transformer, and a connection from a center tap on said last named secondary to the cathodes of said rectifiers, whereby variation in plate current of said second vacuum tube controls the phase relation between the plate and grid potentials of said rectifiers, a control element connected to respond to load variations on said power source, and light means controllable by said element for actuating said photoelectric cells.

CARL J. LUNDBORG.